2,993,837
ENTERIC COATED TABLETS
John F. Millar, Valois, Quebec, and Samuel W. Harder, St. Laurent, Quebec, Canada, assignors to Charles E. Frosst & Co., a corporation of Quebec
No Drawing. Filed July 13, 1959, Ser. No. 826,465
5 Claims. (Cl. 167—82)

The present invention relates to new and useful improvements in enteric coated tablets which are adapted for rapid disintegration in the upper portion of the intestinal tract.

PRIOR ART

It has long been an accepted practice in the compounding of pharmaceutical tablets, to provide certain tablets with an enteric coating. By definition, an enteric coating is one that resists action of stomach fluids but disintegrates or dissolves in the intestine.

The need for an enteric coating on a tablet containing a drug, may arise from several considerations. For example, it may be desirable to prevent gastric digestion or decomposition of the drug, to prevent nausea and vomiting caused by gastric irritation due to the drug, to provide delayed absorption of the drug or to deliver the drug to the intestinal tract for optimum absorption in the duodenum and jejunum.

From these considerations it may be seen that the ideal enteric coating should be one that would not be affected by gasttric secretions for the time a tablet may be expected to remain in the stomach but should dissolve or disintegrate promptly on passing from the stomach into the duodenum. In addition, it is highly desirable from a practical tablet-manufacturing viewpoint that the coating material should be highly soluble in organic solvents of a non-hazardous nature and should form solutions with a relatively low viscosity at a high solids content to provide economy in handling.

The importance of the disintegration time of enteric coated tablets has been recognized by the official test specified in the U.S. Pharmacopoeia, XV. This test requires that enteric coated tablets must withstand the action of simulated gastric fluid at a pH of 1.2 for a period of one hour and must disintegrate within four hours in simulated intestinal fluid at a pH of 7.5.

An enteric material which more than meets these U.S. Pharmacopeial qualifications is a partially esterified polyvinyl alcohol in which the hydroxyl groups are partly esterified by phthalic acid, partly acetylated, and partly unreplaced, said polyvinyl alcohol having a degree of polymerization of from 600 to 800, a phthalyl content within the range of from 60 to 70%, and an acetyl content of from 1.6 to 6.0% as disclosed in application, Serial Number 686,863, filed September 30, 1957, J. Millar, inventor, now Patent No. 2,897,122, July 28, 1959. Properly coated with this material, tablets will withstand disintegration in simulated gastric juice at a pH of 1.2 for two hours or more and yet disintegrate rapidly in simulated intestinal juice at pH 7.5 in about twenty minutes.

There is, however, a serious objection to evaluating enteric coatings at a pH of 7.5, as it has been shown that the pH of the contents of the small intestine is generally at a considerably lower value. Thus, tablets coated with an enteric material which is insoluble or only slowly soluble at this lower value, will not disintegrate or make the drug available in the upper portion of the small intestine where drug absorption occurs most efficiently.

This matter has been studied by many workers in this field. For example, it was stated by Wruble in J. Am. Pharm. Asso., 24, 570, 1935, that recent investigations had definitely indicated that earlier concepts regarding the acidity and alkalinity of the stomach and small intestines respectively were erroneous. It has been shown that the contents of the small intestine are more likely to be acid in reaction, i.e. a pH less than 7, and that the pH of the stomach contents may vary over a range of pH 1.2 to 3, due to the buffering effect of ingested food and regurgitation of the relatively more alkaline intestinal contents.

Similarly, Kanig in Drug Standards, May-June 1954, p. 113, noted that the contents of the small intestine may vary from distinctly acid to slightly alkaline and their pH is the result of an equilibrium between acid chyme from the stomach and alkaline secretions added in the intestine. Kanig also pointed out that the use of enteric tablet coatings selected only on the basis of their solubility at a decidedly alkaline pH could result in tablets passing through the intestine intact.

Mohan and Huyck in Drug Standards, January-February 1956, p. 18, also recognized the fact that the pH of the contents of the intestine is seldom on the alkaline side and consequently when evaluating enteric coatings they used a mixture of simulated gastric and intestinal fluids at a pH of 5, which they assumed to be close to the actual conditions existing in the upper intestine.

Blubaugh, Zapapas and Sparks in J. Am. Pharm. Assoc. Sc. Ed., 47, 857, December 1958, recognized that there is no general agreement as to the pH to which simulated intestinal fluid should be adjusted for in vitro testing of enteric coatings. They are of the opinion that since a pH of 7 is only rarely encountered in the small intestine, the optimum pH range for test solutions should probably be between pH 5 and pH 7.

They also point out, that to be physiologically available, many drugs must be released in the upper part of the small intestine where it is well known that the intestinal contents are still decidedly acid in reaction.

From these various studies, it is evident that a good enteric coating should not only be soluble at a pH of 7.5, but should also be readily soluble to allow prompt tablet disintegration at lower pH values in the range of 5 to 7. In addition, it should remain insoluble and prevent tablet disintegration at pH values of 3 or less.

It is also evident that the rate of solubility of an enteric coating material is of prime importance. On the average, a tablet will traverse the entire length of the small intestine in a period of four to five hours. If a prolonged period is required for the coating to dissolve, the drug will then be released only in the lower portion of the intestinal tract where optimum conditions for absorption may not exist. Thus, to make the drug available in the duodenum or jejunum, it is highly desirable that the enteric coating should be ruptured as soon as possible after leaving the stomach.

APPLICANTS' DEVELOPMENT

In accordance with the present invention, there is now provided an enteric coating material which overcomes the drawbacks of prior art enteric coatings since it possesses the unexpected property of rapid solubility in the slightly acid pH medium existing in the upper portion of the small intestine.

This enteric coating is a polyvinyl acetate phthalate characterized by a degree of polymerization of from 200 to 800, a phthalyl content of from about 38 to 59% and an acetyl content of from 0.2 to 12%.

In accordance with a further feature of the present invention, there is provided a novel enteric coated tablet adapted to rapidly release its medicament in the upper intestine, wherein the pH may be as low as 5.5, which comprises a shaped core containing at least one medicinal agent surrounded by polyvinyl acetate phthalate characterized by a degree of polymerization of from 200 to 800, a phthalyl content of from 38 to 59%, and an acetyl content of from 0.2 to 12%, with a preferred range of from 4.0 to 10.0%.

The polyvinyl acetate phthalate used in accordance with the present invention is also characterized by its high solubility in alcohol which renders it most suitable for application as an enteric coating material and obviates the disadvantage of the acetone-soluble prior art materials such as cellulose acetate phthalate. Furthermore, this material is capable of forming concentrated solutions of low viscosity, thus decreasing the amount of solvent and the number of coatings normally required with prior art enteric coating materials.

The polyvinyl acetate phthalate used in accordance with the present invention may be readily prepared by methods well known in the art, for example as disclosed in U.S.P. 2,455,790 and British specification 742,544.

TABLET COATING PROCEDURE

The tablets are placed in the standard rotating coating pan used in the industry and the coating material is applied in liquid form as a solution in a suitable non-hazardous solvent, for example, ethanol. The coating solution is applied in several increments with the volume used each time being just that sufficient to moisten the surface of all the tablets in the pan. A stream of warm air is blown on the rotating tablets to evaporate the solvent and as the coating dries to a tacky stage, a suitable dusting powder is added to prevent the tablets adhering to each other.

This procedure is repeated until a sufficient thickness of coating material has been built up to completely seal the tablet surface and to resist penetration by gastric secretions for a period of two to six hours.

The solution used can have a concentration of 20 to 40% w./v. with a preferred concentration of about 30% w./v. As a solvent there may be used ketones, lower alcohols or mixtures of alcohols and chlorinated solvents. Preferably, 95% ethanol is used. The number of coatings will vary with the concentration of the enteric coating material. For practical purposes six to ten coatings are applied when using 30% w./v. solution.

The enteric coating of the present invention can be used for coating any pharmaceutical tablet to which it is desired to confer enteric properties.

EXAMPLES

The following examples are submitted as being illustrative of the invention but are not intended to be a limitation thereof.

Example 1

A batch of 100,000 tablets was prepared according to the following formula and procedure.

|  | G. |
|---|---|
| Acetylsalicylic acid crystals | 32,500 |
| Corn starch | 3,500 |
| Lubricant | 1,000 |

The ingredients were well mixed, then slugged to make a 16-mesh granulation. The granulation was then compressed on a tablet machine using 7/16" punches and dies to produce 100,000 tablets, each weighing 370 mg., and containing 325 mg. of acetylsalicylic acid. The tablets were then sub-coated with a water-soluble material using standard techniques known in the art. The batch was then divided into lots of about 2,500 tablets for the application of various enteric coating materials.

Example II 2500 tablets from the above batch were coated with 250 ml. of an alcoholic solution containing 30% w./v. of a polyvinyl acetate phthalate having a phthalyl content of 38%, an acetyl content of 6.1% and a degree of polymerization of approximately 750.

The solution was applied in increments of 25 ml. to the tablets in a standard laboratory tablet coating pan, and the tablets were dusted with talc to prevent sticking, between each application. After all the coating solution had been applied, the tablets were thoroughly dried in a warm air dryer at 37° C. to remove all traces of solvent.

Examples III to VIII

Separate lots of tablets were treated as in Example II, using polyvinyl acetate phthalates having the following properties:

|  | III | IV | V | VI | VII | VIII |
|---|---|---|---|---|---|---|
| Phthalyl content......percent.. | 44.7 | 49.5 | 53 | 57.3 | 58.3 | 51.3 |
| Acetyl content............do... | 5.5 | 5.0 | 4.6 | 4.2 | 4.1 | 9.8 |
| Approximate degree of polymerization................. | 750 | 750 | 750 | 750 | 750 | 250 |

DISINTEGRATION TEST

Disintegration tests were carried out using the U.S. Pharmacopoeia XV apparatus at 37° C. and the following test solutions:

|  | pH |
|---|---|
| (1) Acid buffer solution | 1.2 |
| (2) Acid buffer solution | 3.5 |
| (3) Acid buffer solution | 4.5 |
| (4) Acid buffer solution | 5.5 |
| (5) Acid buffer solution | 6.5 |
| (6) Alkaline buffer solution | 7.5 |

The time at which the first of six tablets developed a rupture in its enteric coating and the time at which the last of the six tablets ruptured was recorded. The results of the disintegration tests are shown in Table I, wherein the time reported are the means of these values.

TABLE I.—AVERAGE DISINTEGRATION TIME IN MINUTES

| Example No. | Percent Phthalyl | pH 1.2 | pH 3.5 | pH 4.5 | pH 5.5 | pH 6.5 | pH 7.5 |
|---|---|---|---|---|---|---|---|
| II | 38 | over 120 | over 120 | 22.5 | 13.7 | 12.5 | 10 |
| III | 44.7 | ...do... | ...do... | 55 | 19.2 | 23.2 | 17.5 |
| IV | 49.5 | ...do... | ...do... | over 120 | 22.5 | 23.2 | 23.5 |
| V | 53 | ...do... | ...do... | ...do... | 25 | 27.5 | 24.5 |
| VI | 57.3 | ...do... | ...do... | ...do... | 26.5 | 30.2 | 26.5 |
| VII | 58.3 | ...do... | ...do... | ...do... | 30.7 | 27 | 18.0 |
| VIII | 51.3 | ...do... | ...do... | ...do... | 24 | 18 | 16.5 |

By way of contrast, similar tests were also done on tablets of the same batch coated with polyvinyl acetate phthalates having the following characteristics.

|  | A | B |
|---|---|---|
| Phthalyl content..............percent.. | 62.6 | 65.8 |
| Acetyl content....................do.... | 3.7 | 3.4 |
| Approximate Degree of Polymerization......... | 750 | 750 |

The disintegration times are reported in Table II.

TABLE II.—AVERAGE DISINTEGRATION TIME IN MINUTES

| Coating Material | pH 1.2 | pH 3.5 | pH 4.5 | pH 5.5 | pH 6.5 | pH 7.5 |
|---|---|---|---|---|---|---|
| A | over 120 | over 120 | over 120 | 60 | 52 | 36 |
| B | ...do... | ...do... | ...do... | 67 | 56 | 35 |

On comparison of the results, shown in Tables I and II, it may be seen that polyvinyl acetate phthalates with a phthalyl content below 59% permit the preparation of tablets which will disintegrate within 13 to 30 minutes even at pH 5.5 while tablets coated with polyvinyl acetate phthalate having only a slightly higher phthalyl content require at least twice as long to disintegrate at pH 5.5. It may be seen that even at pH 6.5 there is a marked reduction in disintegration time of tablets prepared with polyvinyl acetate phthalates having a phthalyl content below 59%.

When the results shown in Tables I and II at pH 5.5 are plotted on a graph in terms of disintegration time versus phthalyl content, it is noted that there is a sudden increase in disintegration time of tablets coated with polyvinyl acetate phthalate having a phthalyl content above 59%. This break in the curve showing a sudden increase in disintegration time was unexpected and unanticipated.

It is thus apparent that polyvinyl acetate phthalates of the class described in the present invention possess unique properties which render them suitable for the preparation of enteric coated medicinal tablets which will release a drug in the upper portion of the intestinal tract.

In the examples quoted above, only one drug has been used. This, however, is not a limitation as similar results have also been obtained with medicinal tablets containing other drugs. In fact, these resins may be used in the preparation of tablets of any drug to which it is desired to confer enteric properties.

We claim:
1. A solid medicinal oral dosage unit containing at least one medicinal agent, comprising a shaped core containing a medicinal agent surrounded by an enteric layer of a partially esterified polyvinyl alcohol in which the hydroxyl groups are partly esterified by phthalic acid, partly acetylated, and partly unreplaced, said partially esterified polyvinyl alcohol having a degree of polymerization of from 200 to 800, a phthalyl content of from 38 to 59% and an acetyl content of from 0.2 to 12%, said enteric coating being substantially resistant to disintegration in aqueous fluids having a pH lower than 3.5 for a period of at least 2 hours, and capable of disintegrating in aqueous fluids having a pH of at least 5.5 in from 10–30 minutes.

2. A solid medicinal oral dosage unit containing at least one medicinal agent, comprising a shaped core containing a medicinal agent surrounded by an enteric layer of a partially esterified polyvinyl alcohol in which the hydroxyl groups are partly esterified by phthalic acid, partly acetylated, and partly unreplaced, said partially esterified polyvinyl alcohol having a degree of polymerization of approximately 750, a phthalyl content of 38% and an acetyl content of 6.1%, said enteric coating being substantially resistant to disintegration in aqueous fluids having a pH lower than 3.5 for a period of at least 2 hours, and capable of disintegrating in aqueous fluids having a pH of at least 5.5 in from 10–30 minutes.

3. A solid medicinal oral dosage unit containing at least one medicinal agent, comprising a shaped core containing a medicinal agent surrounded by an enteric layer of a partially esterified polyvinyl alcohol in which the hydroxyl groups are partly esterified by phthalic acid, partly acetylated, and partly unreplaced, said partially esterified polyvinyl alcohol having a degree of polymerization of approximately 750, a phthalyl content of 58.3% and an acetyl content of 4.1%, said enteric coating being substantially resistant to disintegration in aqueous fluids having a pH lower than 3.5 for a period of at least 2 hours, and capable of disintegrating in aqueous fluids having a pH of at least 5.5 in from 10–30 minutes.

4. A solid medicinal oral dosage unit containing at least one medicinal agent, comprising a shaped core containing a medicinal agent surrounded by an enteric layer of a partially esterified polyvinyl alcohol in which the hydroxyl groups are partly esterified by phthalic acid, partly acetylated, and partly unreplaced, said partially esterified polyvinyl alcohol having a degree of polymerization of approximately 250, a phthalyl content of 51.3% and an acetyl content of 9.8%, said enteric coating being substantially resistant to disintegration in aqueous fluids having a pH lower than 3.5 for a period of at least 2 hours, and capable of disintegrating in aqueous fluids having a pH of at least 5.5 in from 10–30 minutes.

5. A method for preparing a solid enteric coated medicinal dosage unit, comprising applying to a solid shaped dosage unit containing at least one medicament, a layer of an enteric material of a partially esterified polyvinyl alcohol wherein the hydroxyl groups are partly esterified by phthalic acid, partly acetylated and partly unreplaced, said partially esterified polyvinyl alcohol having a degree of polymerization of 200 to 800, a phthalyl content within the range of from 38 to 59%, and an acetyl content of from 0.2 to 12%, said enteric material being applied from an organic solvent and the coating being substantially resistant to disintegration in aqueous fluids having a pH lower than 3.5 for a period of at least 2 hours, and capable of disintegrating in aqueous fluids having a pH of at least 5.5 in from 10–30 minutes.

References Cited in the file of this patent
UNITED STATES PATENTS
2,897,122    Millar _____ July 28, 1959